United States Patent
Bang

(10) Patent No.: US 6,686,929 B2
(45) Date of Patent: Feb. 3, 2004

(54) BROADBAND SWITCHING DRIVE COMPENSATING CIRCUIT FOR A VIDEO DISPLAY DEVICE

(75) Inventor: Jeong Ho Bang, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 420 days.

(21) Appl. No.: 09/750,308

(22) Filed: Dec. 29, 2000

(65) Prior Publication Data

US 2002/0044146 A1 Apr. 18, 2002

(30) Foreign Application Priority Data

Sep. 8, 2000 (KR) ......................................... 2000-53479

(51) Int. Cl.[7] ................................................. G09G 5/02
(52) U.S. Cl. ....................... 345/698; 345/213; 348/536; 315/370
(58) Field of Search ............................... 345/204–214, 345/698, 12–14; 315/370–371; 348/536

(56) References Cited

U.S. PATENT DOCUMENTS

| | | | |
|---|---|---|---|
| 5,929,574 A | * | 7/1999 | Kim et al. ................. 3115/370 |
| 6,091,212 A | * | 7/2000 | Park ............................ 315/370 |
| 6,094,018 A | * | 7/2000 | Fujimori et al. ............ 315/370 |
| 6,225,762 B1 | * | 5/2001 | Fujimori et al. ............ 315/370 |
| 6,414,694 B1 | * | 7/2002 | Byun ........................... 345/698 |

FOREIGN PATENT DOCUMENTS

| | | |
|---|---|---|
| JP | 10-079867 | 3/1998 |
| JP | 10-173953 | 6/1998 |
| KR | 93-026721 | 12/1993 |
| KR | 95-005102 | 2/1995 |
| KR | 97-015561 | 4/1997 |
| KR | 97-049656 | 8/1997 |

* cited by examiner

*Primary Examiner*—Amr Awad
(74) *Attorney, Agent, or Firm*—Robert E. Bushnell, Esq.

(57) ABSTRACT

The present invention relates to a broadband switching drive compensating circuit for a video display device, which comprises a horizontal size detecting unit for detecting a horizontal size; a horizontal frequency detecting unit for detecting a horizontal frequency; a first DC voltage generating unit for generating a first DC voltage according to the detected horizontal size; a second DC voltage generating unit for generating a second DC voltage according to the detected horizontal frequency; a driving current compensating unit for altering a $B^{+1}$ driving current according to the generated first and second DC voltages; and a horizontal deflection unit for switching a horizontal output transistor according to the altered $B^{+1}$ driving current and then supplying a sawtooth current to a horizontal deflection coil. In a multi-mode video display device having a broadband frequency, the driving conditions of a switching power transistor is compensated according to the changes of the horizontal size and the horizontal frequency for establishing the driving conditions of the switching power transistor to the optimum conditions, to thereby perform the stable switching operations of the switching power transistor.

16 Claims, 2 Drawing Sheets

BROADBAND SWITCHING DRIVE COMPENSATING CIRCUIT FOR A VIDEO DISPLAY DEVICE

CLAIM OF PRIORITY

This application makes reference to, incorporates the same herein, and claims all benefits accruing under 35 U.S.C §119 from an application entitled *Broadband Switching Drive Compensating Circuit For A Video Display Device* earlier filed in the Korean Industrial Property Office on Sep. 8, 2000, and there duly assigned Serial No. 2000-53479 by that Office.

BACKGROUND OF THE INVENTION

1. Field of the Invention

The present invention relates to a broadband switching drive compensating circuit for a video display device, and more particularly to a broadband switching drive compensating circuit in a multi-mode video display device having a broadband frequency, capable of performing stable switching operations of a switching power transistor by compensating the drive conditions of the switching power transistor according to horizontal size changes and horizontal frequency changes.

2. Description of the Related Art

In general, a cathode ray tube(CRT) used for a video display device employs a principle of emitting light of different brightness and colors by striking fluorescent materials of red, green, and blue (R, G, B) colors which is coated on the surface of the cathode ray tube with different amounts of electron beams according to the intensity of a video signal. The cathode ray tube (CRT) is widely used since its price and display performance are excellent.

A video display device employing a cathode ray tube inputs a video signal and a synchronous signal from a video card of a computer system and displays information on a screen, which is constituted with a video system for processing a video signal, a deflection system for carrying out vertical and horizontal deflection and a power supply system.

A video card in a host device, such as a computer, supports diverse video modes, and the video modes have different horizontal frequencies and vertical frequencies according to resolutions to be displayed. In particular, if a video card supporting various modes such as VGA, SVGA, a video card supporting a high resolution-dedicated mode, and so on is built in, horizontal frequencies for respective modes are in a range of 30~75 KHz.

Accordingly, when video modes are changed in a multi-mode video display device, an internal circuit of a video display device has a portion to be modified, for example, in display sizes, position changes, horizontal and vertical synchronization, and deflection system optimization.

In an exemplary multi-mode video display device having a broadband frequency, since the driving conditions of the horizontal output transistor are changed if a horizontal size of a displayed video image is changed or a horizontal frequency is changed, there exists a problem in that the horizontal output transistor carries out unstable switching operations.

The exemplary deflection circuit has a drawback in that built-in components may be damaged by excessive heat generation based on the distorted driving conditions of the horizontal output transistor since many of the values in the circuit are fixed.

Further, an active time of the horizontal output transistor is different in every horizontal frequency, thus the base current of the horizontal output transistor should be changed in order to satisfy the driving conditions of the horizontal output transistor if the horizontal frequency is changed. However, since the base current of the horizontal output transistor is fixed, there again exists a problem in that built-in components may be damaged by excessive heat generation based on the distorted driving conditions of the horizontal output transistor.

SUMMARY OF THE INVENTION

In order to solve the above problems, it is an object of the present invention to provide, in a multi-mode video display device having a broadband frequency, a broadband switching drive compensating circuit for a video display device capable of compensating the drive conditions of a switching power transistor according to the changes of the horizontal size and horizontal frequency.

In order to achieve the above object, the circuit according to the present invention comprises a horizontal size detecting unit for detecting a horizontal size of a displayed video image; a horizontal frequency detecting unit for detecting a horizontal frequency; a first DC (direct current) voltage generating unit for generating a first DC voltage according to the detected horizontal size; a second DC voltage generating unit for generating a second DC voltage according to the detected horizontal frequency; a driving current compensating unit for altering a $B^{+1}$ driving current according to the generated first and second DC voltages; and a horizontal deflection unit for switching a horizontal output transistor according to the altered $B^{+1}$ driving current and then supplying a sawtooth current to a horizontal deflection coil.

Accordingly, in a multi-mode video display device having a broadband frequency, the driving conditions of a switching power transistor is compensated according to the changes of the horizontal size and the horizontal frequency for establishing the driving conditions of the switching power transistor to the optimum conditions, to thereby perform the stable switching operations of the switching power transistor.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
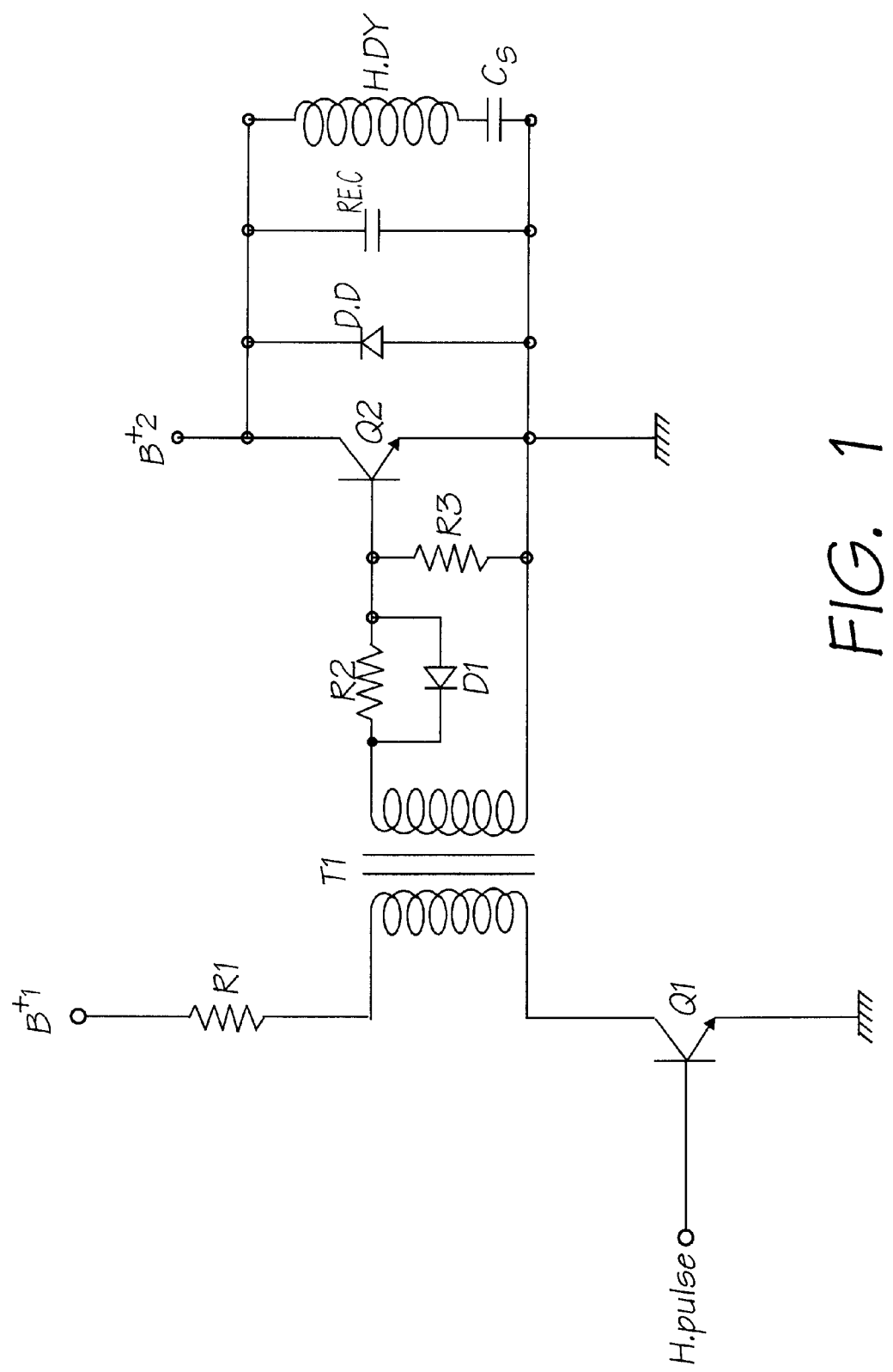
FIG. 1 is a view for showing a horizontal deflection circuit of a video display device having a switching power transformer.

With reference to a horizontal deflection circuit of FIG. 1, operations of a deflection circuit for an video display device will be described in brief, hereinafter.

First, when a horizontal driving transistor Q1 is turned on by a horizontal driving pulse (H.pulse), current is supplied to the base of a horizontal output transistor Q2 through a horizontal driving transformer T1.

At this time, if the horizontal output transistor Q2 is turned on, a $B^{+2}$ current of a flyback transformer FBT (not shown) flows in the horizontal output transistor Q2 through a horizontal deflection coil H.DY.

Accordingly, the turn-on duration of the horizontal output transistor Q2 corresponds to a latter half of a valid scan period of a horizontal sawtooth waveform, and then, if the horizontal output transistor Q2 is abruptly turned off according to the horizontal driving pulse H.pulse, a current charged in the horizontal deflection coil H.DY charges a flyback capacitor RE.C.

If the flyback capacitor RE.C is fully charged, discharge is carried out to the horizontal deflection coil H.DY. Accordingly, a current is again charged in the horizontal deflection coil H.DY. The entire period of the charge and discharge of the flyback capacitor RE.C determines the flyback period and horizontal size of a displayed video image.

If a voltage of a deflection coil is high enough to be applied to a damper diode D.D in a forward bias through the charge of energy in the horizontal deflection coil H.DY, the damper diode D.D is turned on, so that the current flowing in the horizontal deflection coil H.DY falls down to zero. At this time, the current flowing in the damper diode D.D corresponds to a former half of the valid scan period of a horizontal sawtooth wave.

At the time the current goes down to zero, the horizontal output transistor Q2 is turned on by the horizontal driving pulse H.pulse, and, through the repetition of the above process, the sawtooth wave current flows in the horizontal deflection coil H.DY to achieve the horizontal deflection for the horizontal scan.

The $B^{+2}$ current of the flyback transformer (FBT) is changed according to the changes of the horizontal size of a displayed video image, which causes a collector current of the horizontal output transistor Q2 to be changed, so a base current of the horizontal output transistor Q2 should be changed in order to satisfy the driving conditions of the horizontal output transistor Q2.

However, despite the change of the collector current of the horizontal output transistor Q2 in accordance with the change of the horizontal output transistor Q2, the deflection circuit has a drawback in that built-in components may be damaged by excessive heat generation based on the distorted driving conditions of the horizontal output transistor Q2 since the $B^{+1}$ driving current value and the resistance values of resistors R1 and R2 are fixed as well as the base current of the horizontal output transistor Q2 is fixed.

Further, since the active time of the horizontal output transistor Q2 is different in every horizontal frequency, the base current of the horizontal output transistor Q2 should be changed in order to satisfy the driving conditions of the horizontal output transistor Q2 if the horizontal frequency is changed. However, since the $B^{+1}$ driving current value and the resistance values of the resistors R1 and R2 are fixed, there exists a problem in that built-in components may be damaged by excessive heat generation based on the distorted driving conditions of the horizontal output transistor Q2.

Hereinafter, the embodiment according to the present invention will be described in detail with reference to FIG. 2 for showing a broadband switching drive compensating circuit for a video display device.

Figure 2:
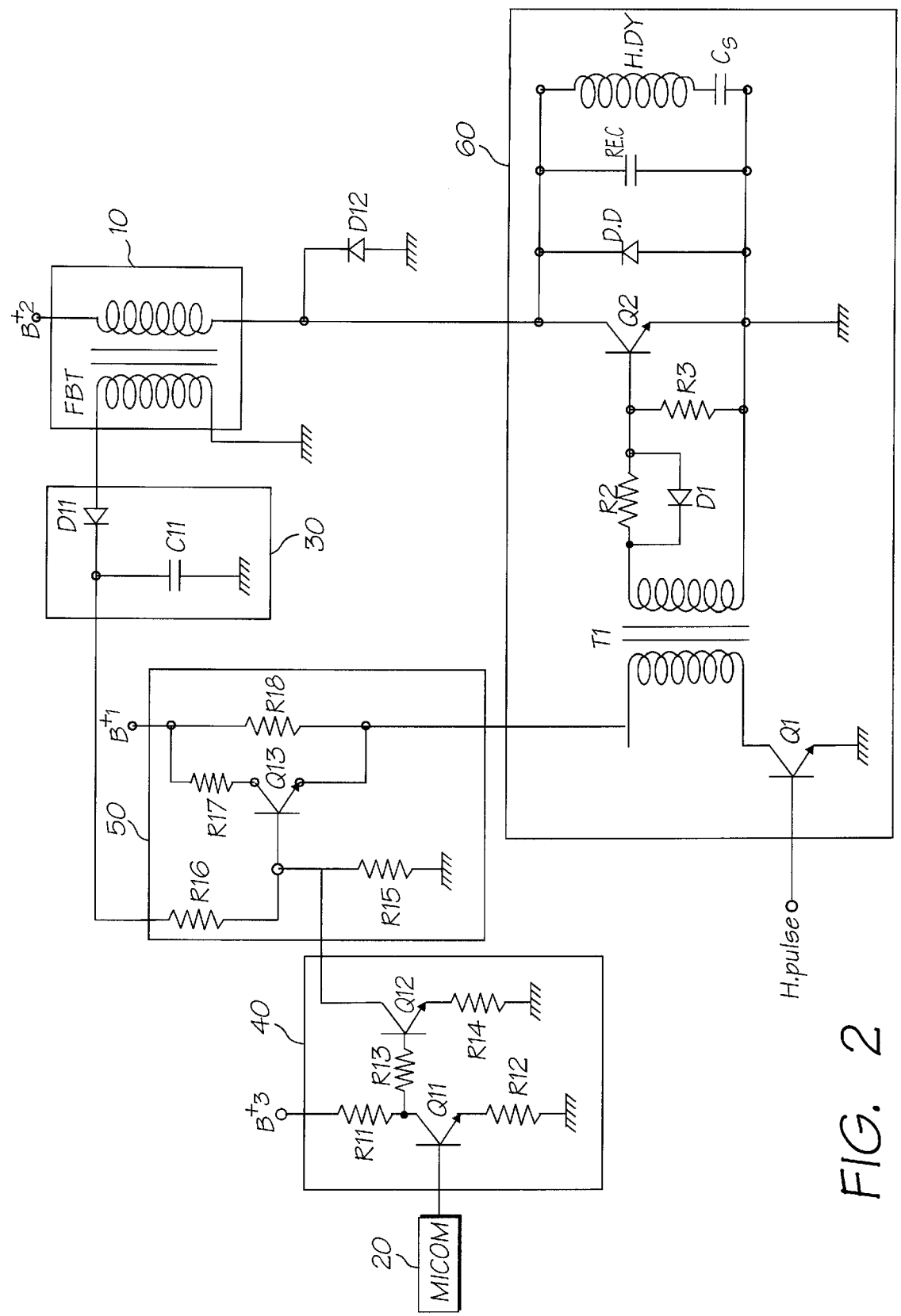
FIG. 2 is a view for showing a broadband switching drive compensating circuit for the switching power transformer in the horizontal deflection circuit of a video display device of FIG. 1 according to an embodiment of the present invention.

As shown in FIG. 2, the circuit according to the embodiment of the present invention includes a horizontal size detecting unit 10 for detecting a horizontal size; a horizontal frequency detecting unit 20; a first DC voltage generating unit 30 for generating a first DC voltage according to the detected horizontal size; a second DC voltage generating unit 40 for generating a second DC voltage according to the detected horizontal frequency; a driving current compensating unit 50 for altering a $B^{+1}$ driving current according to the first and second DC voltages; and a horizontal deflection unit 60 for switching the horizontal output transistor Q2 according to the altered $B^{+1}$ driving current and supplying a sawtooth current to a horizontal deflection coil H.DY.

Here, the horizontal deflection unit 60 has a horizontal driving transformer T1 for receiving the $B^{+1}$ driving current from driving current compensating unit 50. The primary coil of horizontal driving transformer T1 is coupled between driving current $B^{+1}$ via resistor R18 of driving current compensating unit 50 and a ground terminal via a collector and emitter of horizontal driving transistor Q1, when the base of horizontal driving transistor Q1 receives a horizontal driving pulse H.pulse. The on/off switching of transistor Q1 in response to the horizontal driving pulse H.pulse causes a current to be induced across the secondary coil of horizontal driving transformer T1.

A horizontal output transistor Q2 receives a current $B^{+2}$ at a collector thereof via horizontal detecting circuit 10 which is comprised of a flyback transformer FBT for outputting a flyback pulse which will vary in size according to a detected change in horizontal size. The driving current $B^{+2}$ applied to the collector of horizontal output transistor Q2 also varies according to a detected change in horizontal size. A diode D12 is connected between a ground terminal and the collector of horizontal output transistor Q2. An emitter of horizontal output transistor Q2 is connected to a ground terminal and a base of horizontal output transistor Q2 is connected to the secondary coil of horizontal driving transformer T1 via a resistor R2 coupled in parallel with a diode D1. A resistor R3 is connected between the base and emitter of horizontal output transistor Q2.

A damper diode D.D and a flyback capacitor RE.C are connected in parallel between the collector and the emitter of the horizontal output transistor Q2 for generating a sawtooth current based on the switching operation of the horizontal output transistor Q2 and supplying the sawtooth current to the horizontal deflection coil H.DY. The horizontal deflection coil H.DY is coupled to the collector of horizontal output transistor Q2 and further coupled to the emitter of horizontal output transistor Q2 via an "S" correction capacitor $C_S$.

DC voltage generating unit 30 is includes a rectifying diode D11 and a smoothing capacitor C11 for converting the flyback pulse output from the flyback transformer FBT to a DC voltage.

The horizontal frequency detecting unit 20 is a microcomputer MICOM for outputting a pulse width modulated (PWM) signal according to a frequency of a horizontal synchronous signal which is externally supplied thereto.

The PWM signal is applied to the base of a transistor Q11 of DC voltage generating unit 40. A driving current $B^{+3}$ is applied to a collector of transistor Q11 via a resistor R11, and an emitter of transistor Q11 is connected to a ground terminal via a resistor R12. The collector of transistor Q11 is also connected to the base of a transistor Q12 via a resistor R13, and an emitter of transistor Q12 is connected to a ground terminal via a resistor R14. The collector of transistor Q12 is connected to driving current compensating circuit 50. DC voltage generating unit 40 generates the second DC voltage in response the PWM signal received from the microcomputer MICOM.

The driving current compensating unit 50 has a transistor Q13 for controlling a magnitude of the driving current $B^{+1}$ to be supplied to the primary coil of the driving transformer T1, wherein the base of transistor Q13 is connected to DC voltage generating unit 30 via a resistor R16 and to the collector of transistor Q12 of DC voltage generating unit 40. The base of transistor Q13 is also connected to a ground terminal via a resistor R15. The collector of transistor Q13 is connected to driving current $B^{+1}$ via resistor R17. The emitter of transistor Q13 is connected driving current $B^{+1}$ via resistor R18 and is further connected to the primary coil of driving transformer T1.

Hereinafter, operations and effects of the circuit according to an embodiment of the present invention as constructed above will be described in detail.

The flyback transformer FBT of the horizontal size detecting unit 10 outputs a flyback pulse the magnitude of which varies according to a change in horizontal size. Accordingly, the rectifying diode D11 and the smoothing capacitor C11 of the first DC voltage generating unit 30 convert the flyback pulse into the first DC voltage.

Further, the microcomputer MICOM of the horizontal frequency detecting unit 20 outputs a PWM signal according to a frequency of the externally applied horizontal synchronous signal. Accordingly, the first and second transistors Q11 and Q12 of the second DC voltage generating unit 40 generate the second DC voltage in response to the PWM signal input from the microcomputer MICOM.

That is, a voltage of the base of the first transistor Q11 is changed based on the PWM signal input from the microcomputer MICOM. Accordingly, a current of the collector of the first transistor Q11 is changed so that a $B^{+3}$ current supplied to the base of the second transistor Q12 is changed. As the current at the base of the second transistor Q12 is changed, a resistance between the collector and the emitter of the second transistor Q12 varies, so that the degree of the saturation of the third transistor Q13 varies according to resistance formula 1(a).

$$\frac{R_{15}}{R_{Q12}+R_{14}} \quad 1(a)$$

In the meantime, the third transistor Q13 of the driving current compensating unit 50 is supplied with the first and second DC voltages through the base thereof, the collector and the emitter thereof are connected between the $B^{+1}$ driving current and the primary coil of the driving transformer T1, so that a magnitude of the $B^{+1}$ driving current is controlled by the base current to be supplied to the primary coil of the driving transformer T1.

That is, as the $B^{+1}$ driving current varies based on resistance formula 1(b), the current flowing in the horizontal driving transformer T1 is changed based on resistance formula 1(c). Accordingly, the base current supplied to the horizontal output transistor Q1 varies.

$$R_{16}+\frac{R_{15}}{R_{Q12}+R_{14}} \quad 1(b)$$

$$\frac{R_{Q13}+R_{13}}{R_{18}} \quad 1(c)$$

That is, as the $B^{+2}$ current of the flyback transformer FBT varies according to a change of horizontal size, the collector current of the horizontal output transistor Q2 varies. Accordingly, the base current of the horizontal output transistor Q2 will vary to satisfy the driving conditions of the horizontal output transistor Q2.

Accordingly, the present invention satisfies the driving conditions of the horizontal output transistor Q2 by changing the base current of the horizontal output transistor Q2 through the change of the $B^{+1}$ driving current.

For example, as the horizontal size increases, the $B^{+2}$ current of the flyback transformer FBT increases. As the collector current of the horizontal output transistor Q2 increases, the size of a flyback pulse output from the flyback transformer FBT gets larger, causing the first DC voltage to be increased. Accordingly, the base voltage of the third transistor Q13 increases, so that the $B^{+1}$ driving current supplied to the primary coil of the horizontal driving transformer T1 increases.

Accordingly, the current derived in the secondary coil of the horizontal driving transformer T1 increases, causing the base current of the horizontal output transistor Q2 to be increased. As a result, as the collector current of the horizontal driving transistor increases with the increase of the horizontal size, the base current is also increased so that the horizontal output transistor Q2 has the optimum driving conditions.

Further, since the active times are different in every horizontal frequency, in order to satisfy the driving conditions of the horizontal output transistor Q2, the base current of the horizontal output transistor Q2 is changed according to a horizontal frequency. At this time, the base voltage of the third transistor Q13 is changed by varying the second DC voltage according to the change of the horizontal frequency, to thereby change the $B^{+1}$ current supplied to the primary coil of the horizontal driving transformer T1.

Accordingly, the current derived in the secondary coil of the horizontal driving transformer T1 is changed, causing the base current of the horizontal output transistor Q2 to be varied. As a result, the horizontal output transistor Q2 has the optimum driving conditions by varying the base current of the horizontal output transistor Q2 according to the horizontal frequency. For example, when the horizontal frequency is 68 KHz, the active time of the horizontal output transistor Q2 is the smallest, to thereby require the largest $B^{+1}$ driving current.

As stated above, the present invention, in a multi-mode video display device having a broadband frequency, compensates the driving conditions of a switching power transistor according to the changes of a horizontal size and a horizontal frequency for establishing the driving conditions of the switching power transistor at the optimum conditions all the time, so that the switching power transistor performs stable switching operations.

Although the preferred embodiment of the present invention has been described, it will be understood by those skilled in the art that the present invention should not be limited to the described preferred embodiment, but various changes and modifications can be made within the spirit and scope of the present invention as defined by the appended claims.

What is claimed is:

1. A broadband switching drive compensating circuit for a video display device, comprising:
    a horizontal size detecting circuit connected to a $B^{+2}$ driving current, said horizontal size detecting circuit detecting a horizontal size of a displayed video image;
    a horizontal frequency detecting circuit detecting a horizontal frequency in response to an externally applied horizontal synchronization signal;

a first DC (direct current) voltage generating circuit generating a first DC voltage according to the detected horizontal size;

a second DC voltage generating circuit connected to a $B^{+3}$ driving current, said second DC voltage generating circuit generating a second DC voltage according to the detected horizontal frequency;

a driving current compensating unit for altering a $B^{+1}$ driving current in response to the generated first and second DC voltages; and a horizontal deflection unit having a horizontal output transistor supplying a sawtooth current to a horizontal deflection coil, characterized in that a driving condition of said horizontal output transistor is compensated for according to the altered $B^{+1}$ driving current.

2. The broadband switching drive compensating circuit as claimed in claim 1, wherein the horizontal deflection unit includes:

a horizontal driving transformer having a primary coil for receiving the altered $B^{+1}$ driving current and a secondary coil for supplying a base current to a base of said horizontal output transistor in response to a voltage induced in said secondary coil;

a horizontal driving transistor being switched in response to a horizontal driving pulse applied to a base of said horizontal driving transistor, a collector of said horizontal driving transistor being connected to said primary coil of said horizontal driving transistor and an emitter of said horizontal driving transistor being connected to a ground terminal;

a first resistor and a first diode connected in parallel between said secondary coil and said base of said horizontal output transistor;

a second resistor connected between said base of said horizontal output transistor and said ground terminal;

said horizontal output transistor having a collector connected to said horizontal size detecting circuit to receive said $B^{+2}$ driving current, said $B^{+2}$ driving current being varied when the horizontal size changes;

said horizontal output transistor having an emitter connected to said ground terminal;

a damper diode and a flyback capacitor connected in parallel between the collector and the emitter of said horizontal output transistor, and a horizontal deflection coil and a correction capacitor connected in series between the collector and the emitter of said horizontal output transistor.

3. The broadband switching drive compensating circuit as claimed in claim 1, wherein the horizontal size detecting circuit is a flyback transformer for outputting a flyback pulse varying in size according to a change in the detected horizontal size.

4. The broadband switching drive compensating circuit as claimed in claim 1, wherein the horizontal frequency detecting circuit is a microcomputer for outputting a pulse width modulated signal in response to the detected horizontal frequency of the externally applied horizontal synchronization signal.

5. The broadband switching drive compensating circuit as claimed in claim 3, wherein the first DC voltage generating circuit includes a rectifying diode and a smoothing capacitor for converting the flyback pulse output from the flyback transformer into the first DC voltage.

6. The broadband switching drive compensating circuit as claimed in claim 4, wherein the second DC voltage generating circuit comprises first and second transistors for generating the second DC voltage in response to the pulse width modulated signal input from the microcomputer.

7. The broadband switching drive compensating circuit as claimed in claim 6, wherein the second DC voltage generating circuit further comprises:

a first resistor connected between a source of said $B^{+3}$ driving current and a collector of said first transistor;

a second resistor connected between an emitter of said first transistor and a ground terminal;

a base of said first transistor being connected to receive said pulse width modulated signal from said microcomputer;

a third resistor connected between said collector of said first transistor and a base of said second transistor;

a fourth resistor connected between an emitter of said second transistor and said ground terminal; and a collector of said second transistor being connected to output said second DC voltage to said driving current compensating unit.

8. The broadband switching drive compensating circuit as claimed in claim 1, wherein the driving current compensating unit includes:

a compensating transistor having a base receiving said second DC voltage generated by said second DC voltage generating circuit;

a first resistor for providing said first DC voltage to said base of said compensating transistor;

a second resistor connected between said base of said compensating transistor and a ground terminal;

a third resistor connected between a source of said $B^{+1}$ driving current and a collector of said compensating transistor; and a fourth resistor connected between said source of said $B^{+1}$ driving current and an emitter of said compensating transistor, a common node connecting said forth resistor and said emitter of said compensating transistor being connected to said horizontal deflection unit.

9. The broadband switching drive compensating circuit as claimed in claim 7, wherein the driving current compensating unit includes:

a compensating transistor having a base connected to said collector of said second transistor to receive said second DC voltage generated by said second DC voltage generating circuit;

a fifth resistor for providing said first DC voltage to said base of said compensating transistor;

a sixth resistor connected between said base of said compensating transistor and a ground terminal;

a seventh resistor connected between a source of said $B^{+1}$ driving current and a collector of said compensating transistor; and an eighth resistor connected between said source of said $B^{+1}$ driving current and an emitter of said compensating transistor, a common node connecting said forth resistor and said emitter of said compensating transistor being connected to said horizontal deflection unit.

10. The broadband switching drive compensating circuit as claimed in claim 9, wherein the horizontal deflection unit includes:

a horizontal driving transformer having a primary coil connected to said common node of said driving current compensating unit for receiving the altered $B^{+1}$ driving current, said horizontal driving transformer having a secondary coil for supplying a base current to a base of said horizontal output transistor in response to a voltage induced in said secondary coil;

a horizontal driving transistor being switched in response to a horizontal driving pulse applied to a base of said horizontal driving transistor, a collector of said horizontal driving transistor being connected to said primary coil of said horizontal driving transistor and an emitter of said horizontal driving transistor being connected to said ground terminal;

a ninth resistor and a first diode connected in parallel between said secondary coil and said base of said horizontal output transistor;

a tenth resistor connected between said base of said horizontal output transistor and said ground terminal;

said horizontal output transistor having a collector connected to said horizontal size detecting circuit to receive said $B^{+2}$ driving current, said $B^{+2}$ driving current being varied when the horizontal size changes;

said horizontal output transistor having an emitter connected to said ground terminal;

a damper diode and a flyback capacitor connected in parallel between the collector and the emitter of said horizontal output transistor, and a horizontal deflection coil and a correction capacitor connected in series between the collector and the emitter of said horizontal output transistor.

11. The broadband switching drive compensating circuit as claimed in claim 10, further comprising a second diode connected between said ground terminal and said collector of said horizontal output transistor.

12. A method to compensate for driving conditions of a horizontal output transistor is compensated according to changes of a horizontal size and a horizontal frequency of a multi-mode video display device having a broadband frequency, the method comprising steps of:

detecting a horizontal size of a displayed video image;

detecting a horizontal frequency in response to an externally applied horizontal synchronization signal;

generating a first direct current voltage in response to detected horizontal size;

generating a second direct current voltage in response to the detected horizontal frequency;

altering a driving current of the horizontal output transistor in response to the generated first and second direct current voltages;

varying abase current of said horizontal output transistor in response to the altered driving current to compensate for the driving conditions of said horizontal ouput transistor; and supplying a sawtooth current to a horizontal deflection coil in response to said varying step.

13. The method as set forth in claim 12, said step generating a first direct current voltage comprises rectifying a flyback pulse output from a flyback transformer to generate said first direct current voltage.

14. The method as set forth in claim 12, said step of generating a second direct current voltage comprises receiving a pulse width modulated signal from microcomputer in response to the detected horizontal frequency and converting a first current into said second direct current voltage in response to said pulse width modulated signal.

15. The method as set forth in claim 12, further comprising:

generating a flyback pulse according to a first current applied to a flyback transformer and in response to an output of said horizontal output transistor;

rectifying said flyback pulse output from to generate said first direct current voltage;

receiving a pulse width modulated signal from microcomputer in response to the detected horizontal frequency; and converting a second current into said second direct current voltage in response to said pulse width modulated signal.

16. A method to compensate for driving conditions of a horizontal output transistor is compensated according to changes of a horizontal size and a horizontal frequency of a multi-mode video display device having a broadband frequency, the method comprising steps of:

generating a flyback pulse according to a first current applied to a flyback transformer and in response to an output of said horizontal output transistor;

rectifying said flyback pulse output from to generate a first direct current voltage;

detecting a horizontal frequency in response to a horizontal synchronization signal externally applied to a microcomputer and outputting a pulse width signal from said microcomputer in response to the detected horizontal frequency;

converting a second current into a second direct current voltage in response to said pulse width modulated signal;

altering a driving current of the horizontal output transistor in response to the first and second direct current voltages;

varying a base current of said horizontal output transistor in response to the altered driving current to compensate for the driving conditions of said horizontal output transistor; and supplying, from said horizontal output transistor, a sawtooth current to a horizontal deflection coil in response to said varying step.

* * * * *